US012625540B2

(12) United States Patent
Simlai et al.

(10) Patent No.: US 12,625,540 B2
(45) Date of Patent: May 12, 2026

(54) INTELLIGENT POWER OPTIMIZATION MECHANISM VIA AN ENHANCED CPU POWER MANAGEMENT ALGORITHM

(71) Applicant: Google LLC, Mountain View, CA (US)

(72) Inventors: Ananya Simlai, London (GB); Ming Wen, Santa Clara, CA (US); Ian Kenneth Coolidge, San Diego, CA (US); Santanu Dasgupta, Fremont, CA (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 18/379,798

(22) Filed: Oct. 13, 2023

(65) Prior Publication Data

US 2025/0123673 A1      Apr. 17, 2025

(51) Int. Cl.
G06F 1/32          (2019.01)
G06F 1/329         (2019.01)
(52) U.S. Cl.
CPC .................................... G06F 1/329 (2013.01)
(58) Field of Classification Search
CPC ....................................................... G06F 1/329
See application file for complete search history.

(56) References Cited

U.S. PATENT DOCUMENTS

| 9,063,730 | B2 * | 6/2015 | Dighe | ................... | G06F 1/3206 |
| 10,416,897 | B2 * | 9/2019 | Jin | ......................... | G06F 3/0685 |
| 2009/0235260 | A1 * | 9/2009 | Branover | ............. | G06F 1/3296 |
| | | | | | 712/203 |

| 2014/0075222 | A1 * | 3/2014 | Jackson | ................... | G06F 1/329 |
| | | | | | 713/320 |
| 2016/0252943 | A1 * | 9/2016 | Varma | ................. | G06F 9/45558 |
| | | | | | 713/310 |
| 2017/0286332 | A1 * | 10/2017 | Kotary | .................... | G06F 13/24 |
| 2017/0364140 | A1 * | 12/2017 | Banerjee | .............. | G06F 1/3206 |
| 2019/0018471 | A1 * | 1/2019 | Chen | ........................ | G06F 9/54 |
| 2020/0133367 | A1 * | 4/2020 | Wang | ............... | H03M 13/6588 |
| 2021/0117307 | A1 | 4/2021 | MacNamara et al. | | |

(Continued)

FOREIGN PATENT DOCUMENTS

CN          116775259  A  *  9/2023

OTHER PUBLICATIONS

B. Wensley: "Save Power With Per-Pod Power Management for Latency-Sensitive Workloads," 2023 Red Hat, Inc., Mar. 23, 2023, pp. 1-10.

(Continued)

*Primary Examiner* — Phil K Nguyen
*Assistant Examiner* — Cheri L Harrington
(74) *Attorney, Agent, or Firm* — Lerner David LLP

(57)          ABSTRACT

The presently disclosed technology provides methods and systems for optimally allocating power among workloads executing on a computer system through use of a power management algorithm. For example, according to the present technology a plurality of CPUs within a server can be divided into multiple groups according to application workloads. Workloads can be distributed to the CPUs as needed by a workload scheduler, and the workload scheduler can provide the CPU IDs to a power manager, enabling the power manager to optimize power settings. Each group of CPUs can be assigned an optimal power profile tailored to its respective situation.

16 Claims, 6 Drawing Sheets

(56)  References Cited

U.S. PATENT DOCUMENTS

| | | | | |
|---|---|---|---|---|
| 2021/0397476 A1* | 12/2021 | Liu | ........................ | G06F 9/5094 |
| 2023/0126109 A1* | 4/2023 | Mukherjee | ............ | G06F 1/3234 |
| | | | | 713/320 |
| 2023/0136437 A1 | 5/2023 | Bagwell et al. | | |
| 2023/0161631 A1* | 5/2023 | Sharma | ................. | G06F 9/4856 |
| | | | | 718/104 |
| 2024/0152194 A1* | 5/2024 | Hsieh | ..................... | G06N 20/00 |
| 2024/0354170 A1* | 10/2024 | Mehrotra | ............ | G06F 9/45558 |

OTHER PUBLICATIONS

P. Brownlow: "Power Manager—Kubernetes Operator Technology Guide," Intel Corporation, Oct. 2021, pp. 1-22.
International Search Report and Written Opinion for International Application No. PCT/US2024/046070 dated Dec. 23, 2024. 14 pages.

* cited by examiner

Server Computing Device 102

Processing Component(s) 104

CPU(s) 112

Power Management System 120

Memory 106

Instructions 116

Data 118

INTELLIGENT POWER OPTIMIZATION MECHANISM VIA AN ENHANCED CPU POWER MANAGEMENT ALGORITHM

BACKGROUND

As electronic data volume and network traffic exponentially increase, enterprise customers with on-premises or cloud data center services, as well as communication service providers, are actively seeking cost saving opportunities through server power optimization. Various enterprise workloads and telco workloads run on-premises or in the cloud, and although power management policies already exist, optimizing server power flexibly in such a diverse and complex environment presents challenges.

BRIEF SUMMARY

It has been recognized that, in view of the desire to optimize server power flexibly in diverse and complex environments, it is advantageous to divide server central processing unit (CPU) cores into multiple groups by the type of workloads the CPU cores process. Such grouping facilitates easier productization and comprehension. These groups can be modified as the server operations to adaptively create a comprehensive power optimization solution tailored to various products and services.

The presently disclosed technology provides methods and systems for optimally allocating power among workloads executing on a computer system through use of a power management algorithm. For example, according to the present technology a plurality of CPUs within a server can be divided into multiple groups according to application workloads. Workloads can be distributed to the CPUs as needed by a workload scheduler, and the workload scheduler can provide the CPU IDs to a power manager, enabling the power manager to optimize power settings. Each group of CPUs can be assigned an optimal power profile tailored to its respective situation.

In accordance with an aspect of the present technology, a method for managing power in a computing device includes receiving a number of isolated central processing units (CPUs), the number of isolated CPUs indicating a quantity of CPUs of the computing device set as isolated CPUs; allocating the isolated CPUs based on the number of isolated CPUs; identifying, by one or more processors, CPU IDs of reserved CPUs, the reserved CPUs including CPUs of the computing device that are not set as the isolated CPUs; and controlling, by one or more processors, P-states and C-states of one or more of the reserved CPUs based on the identified CPU IDs.

DETAILED DESCRIPTION

The technology relates generally to power optimization techniques for computing devices, especially server computing devices. Server computing devices may adaptively apply CPU power profiles to manage power and energy consumption. A power profile consists of a specific setting for an individual CPU or a group of CPUs. It defines how the CPU or the group of CPUs should behave in terms of power consumption when performing a specific application or executing a specific workload. Power profiles may include parameters such as clock speed, voltage, fan speed, and sleep mode settings. These profiles are tailored to optimize power consumption and can vary depending on platform or application-related workloads within a server or system.

The server computing devices can each include a power manager. The power manager can include a P/C state controller comprising a P-manager and a C-manager to perform power control tasks by respectively altering P-states and/or C-states of individual CPUs. The power manager can dynamically adjust power consumption by applying a power profile selected by a user to an individual CPU or to a group of CPUs for running applications. The power profile can include one or more states for the individual CPU or group of CPUs, such as operating frequency, power supply voltage, and/or sleep states of the CPUs. The power manager can further dynamically adjust power consumption of the individual CPU or a group of CPUs by communicating with a workload scheduler. The workload scheduler can efficiently allocate workloads to CPUs for application execution and can provide the power manager with the CPU IDs of CPUs selected for running applications. The states of the CPUs can be dynamically adjusted based on the relevant power profiles by controlling the P-states and C-states of the CPUs.

Figure 1:
FIG. 1 is a block diagram of an example server computing device on which power optimization according to aspects of the disclosure may be implemented.
Figure 1:
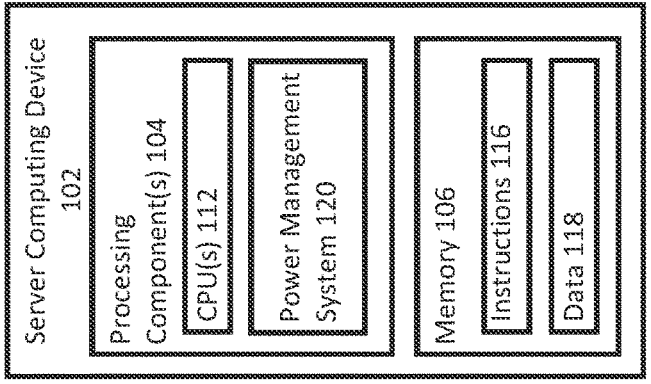

FIG. 1 is a block diagram 100 of an example server computing device 102 in which power optimization according to aspects of the disclosure may be implemented. The server computing device 102 may include one or more processing components 104 and memory 106 storing instructions 116 and data 118. The processing components 104 can be specified for performing one or more workloads for applications. Example processing component 104 can include one or more central processing units (CPUs) 112, graphic processing units (GPUs), and/or field-programmable gate arrays (FPGAs). The processing components 104 can include a power management system 120 for managing the power of the CPUs. This system controls the states of the CPUs to optimize power consumption or adjust performance. Key functions of the power management system 120 include adjusting the frequency; and/or voltage of the CPU, enabling or disabling CPU cores, and managing CPU states. In some embodiments, the power management system 120 is made up of a combination of hardware and software components that allow for CPU configuration adjustments based on user preference or system requirements.

The memory 106 can store information accessible by the processing components 104, including instructions 116 that can be executed by the processing components 104. The memory 106 can also store data 118 that can be retrieved, manipulated, or stored by the processing components 104. The memory 106 can be any type of transitory or non-transitory computer readable medium capable of storing information accessible by the processing components 104, such as volatile or non-volatile memory. For example, memory 106 can include high bandwidth memory (HBM), static random-access memory (SRAM), dynamic random access memory (DRAM), synchronous dynamic random access memory (SDRAM), flash memory, and/or read only memory (ROM).

The instructions 116 can include one or more instructions that, when executed by the processing components 104, cause the one or more processing components 104 to perform actions defined by the instructions 116. The instructions 116 can be stored in object code format for direct processing by the processing components 104, or in other formats including interpretable scripts or collections of independent source code modules that are interpreted on demand or compiled in advance. The instructions 116 can include instructions for implementing a power management system 120, to be described further below. The power management system 120 can be executed using the CPUs 112 and/or using other processing components remotely located on other server computing devices.

The data 118 can be retrieved, stored, or modified by the processing components 104 in accordance with the instructions 116. The data 118 can be stored in computer registers, in a relational or non-relational database as a table having a plurality of different fields and records, or as JSON, YAML, proto, or XML documents. The data 118 can also be formatted in a computer-readable format such as, but not limited to, binary values, ASCII, or Unicode. Moreover, the data 118 can include information sufficient to identify relevant information, such as numbers, descriptive text, proprietary codes, pointers, references to data stored in other memories, including other network locations, or information that is used by a function to calculate relevant data.

Server computing device 102 may be resident on a single computing device. For example, the server computing device 102 may be a server, personal computer, or mobile device. Alternatively, server computing device 102 may be resident on a cloud computing system or other distributed system.

Figure 2:
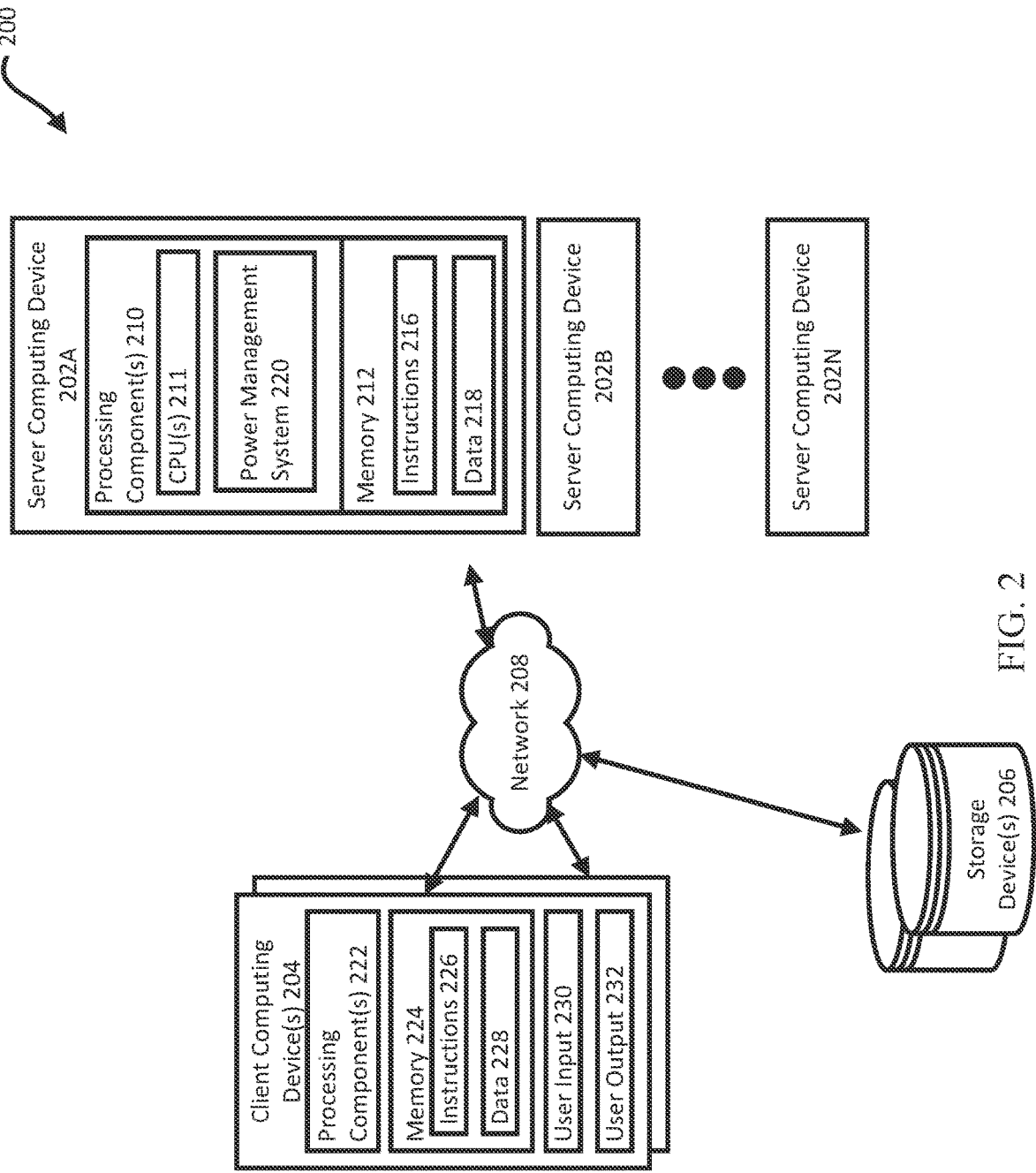
FIG. 2 is a block diagram of a distributed cloud platform in which power optimization according to aspects of the disclosure may be implemented.

FIG. 2 is a block diagram of a distributed cloud platform 200 in which power optimization according to aspects of the disclosure may be implemented. The distributed cloud platform 200 can provide for services that allow for provisioning or maintaining computing resources and/or applications, such as for data centers, cloud environments, and/or container frameworks. For example, the distributed cloud platform 200 can be used as a service that provides software applications, such as communication services, accounting, word processing, inventory tracking, etc. As another example, the infrastructure of the platform 200 can be partitioned in the form of virtual machines or containers on which software applications are run.

The distributed cloud platform 200 can be implemented on one or more devices having one or more processing components in one or more locations, such as in a plurality of server computing devices 202A-N and one or more client computing devices 204. The plurality of server computing devices 202 and the client computing devices 204 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The client computing devices 204 can be configured similarly to the server computing devices 202, with one or more processing components 222, memory 224, instructions 226, and data 228. The client computing devices 204 can also include a user input 230 and a user output 232. The user input 230 can include any appropriate mechanism or technique for receiving input from a user, such as keyboard, mouse, mechanical actuators, soft actuators, touchscreens, microphones, and sensors. The user output 232 can include any appropriate mechanism or technique for providing information to a platform user of the client computing device 204. For example, the user output 232 can include a display for displaying at least a portion of data received from one or more of the server computing devices 202. As another example, the user output 232 can include an interface between the client computing device 204 and one or more of the server computing devices 202. As yet another example, the user output 232 can include one or more speakers, transducers, or other audio outputs, or haptic interfaces or other tactile feedback that provides non-visual and non-audible information to the platform user of the client computing device 204.

Although FIG. 2 illustrates the processing components 210, 222, the memories 212, 224 as being within the respective computing devices 202, 204, components described herein can include multiple processing components, and memories that can operate in different physical locations and not within the same computing device. For example, some of the instructions 216, 226 and the data 218, 228 can be stored on a removable SD card and others within a read-only computer chip. Some or all of the instructions 216, 226 and data 218, 228 can be stored in a location physically remote from, yet still accessible by, the processing components 210, 222. Similarly, the processing components 210, 222 can include a collection of processing components that can perform concurrent and/or sequential operations. The computing devices 202, 204 can each include one or more internal clocks providing timing information, which can be used for time measurement for operations and programs run by the computing devices 202, 204.

One or more of the server computing devices 202 can be configured to receive requests to process data from the client computing device 204, such as part of a query for a particular application. The server computing devices 202 can receive the query and in response, generate output data, such as a response to the query for the particular application. As the server computing device 202 is processing and responding to requests, a power management system 220 can monitor the states of CPUs 211 for optimizing the power consumption. Based on instructions from the power management system 220, the server computing device 202 can adjust various states of the CPUs 211, such as for optimizing power usage.

Figure 3:
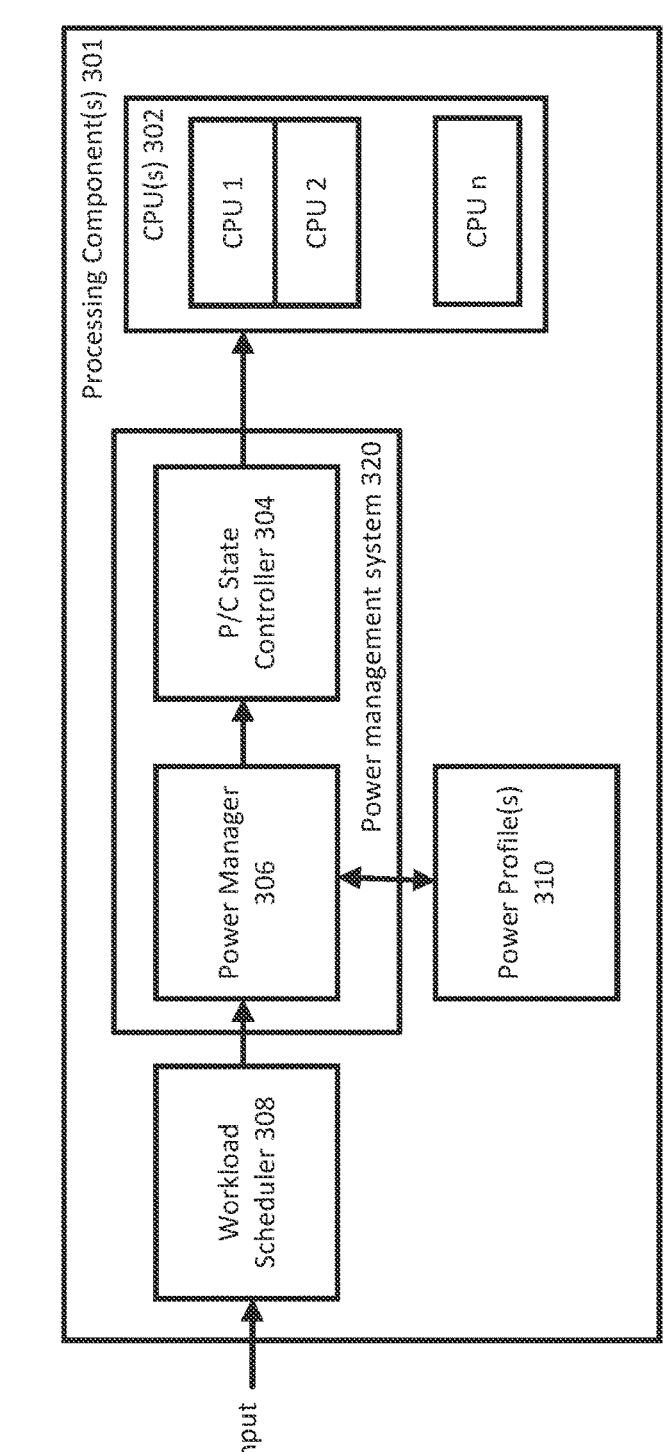
FIG. 3 is a block diagram of an example processing environment for implementing power optimization within a server computing device according to aspects of the disclosure.

FIG. 3 is a block diagram of an example processing environment 300 for implementing power optimization within a server computing device according to aspects of the disclosure. As can be seen from FIG. 3, a server computing device (e.g., server computing device 102) may include one or more processing components 301. The one or more processing components 301 may include one or more CPUs 302 which includes one or more cores, and an operating system of the processing components 301 may execute a power management system 320. The power management system 320 may include a power manager 306 and a P/C state controller 304. Based on instructions from the power manager 306, the P/C state controller 304 may set P-states and/or C-states to meet the performance needs of the server computing device. P/C-state controller 304 and/or power manager 306 may be implemented by hardware, by software, and/or by any combination of hardware and/or software. The power manager 306 can be implemented not only on the local computing devices but also on the distributed cloud platform.

The power manager 306 may control power consumption of one or more CPUs 302 by determining a range of C-state and P-state values. For example, in order to set the range, power manager 306 may set an upper C-state and P-state limit and a lower C-state and P-state limit, by issuing instructions to the P/C state controller 304. The P/C-state controller 304 can adjust C-state and P-state values within the specified range, guided by one of power profiles 310.

Power profiles 310 are typically developed and provided by platform vendors or application developers. These entities can create and offer optimized power profiles for specific situations. Power profiles 310 can be managed and modified by the power management system 320 based on the CPU workloads. Power profiles 310 can be adjusted dynamically while the system is running based on the CPU workloads. The server computing device (e.g., server computing device 102) can select which power profile to use based on a specific application or use case. This selection is carried out by associating the power profiles 310 with CPUs or applications, and the workload scheduler 308 and/or the power management system 320 of the server computing device can identify the association.

The workload scheduler 308 is a server computing system software or component responsible for efficiently managing and distributing tasks and workloads. The workload scheduler 308 manages and determines which CPUs to allocate when executing submitted applications. CPU IDs are used to select CPUs for the application-related workloads. The workload scheduler 308 can provide the CPU IDs to the power manager 306 and the power manager 306 can be configured to control the power states for the specific CPU based on the CPU ID provided by workload scheduler 308. This allows multiple applications to run simultaneously, minimizing resource conflicts and optimizing power consumption. The workload scheduler 308 may be implemented on a computing device in which CPUs 302 reside, or on a distributed cloud platform.

Figure 4:
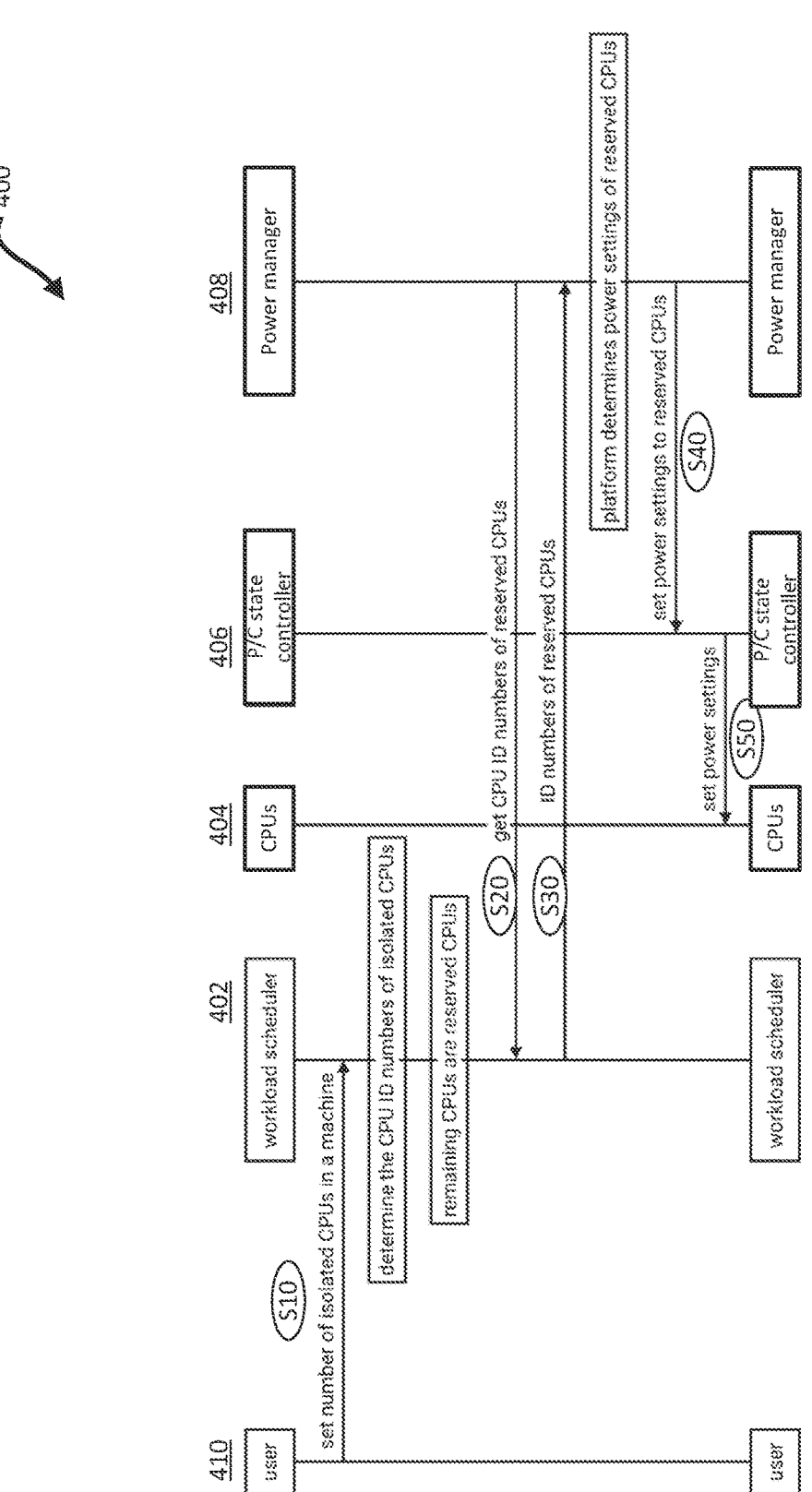
FIG. 4 is a sequence diagram showing signal flows among elements of the FIG. 3 processing environment according to an illustrative power management algorithm for setting power states of CPUs assigned to platform-related workloads.

FIG. 4 is a sequence diagram 400 showing signal flows among elements of the FIG. 3 processing environment 300 according to an illustrative power management algorithm for setting power states of CPUs assigned to platform-related workloads. A server computing device, such as server computing device 102, can be configured to enable the setting of CPU power states through the BIOS settings of the server computing device. In some embodiments, the operating system and/or platform of the server computing device 102 can designate CPUs as isolated CPUs based on a user input specifying a quantity of CPUs to be used as isolated CPUs. The CPUs designated for application-related workloads are referred to as "isolated CPUs," while the remaining CPUs that handle the platform-related workloads are referred to as "reserved CPUs."

The server computing device 102 receives a number indicating a quantity of isolated CPUs to run the applications (S10). The number may be determined by a user taking into account the application-related workloads to be processed. That is, the server computing device 102 can be configured to provide an interface to receive the number indicating a quantity of isolated CPUs for the application workloads. The interface can be provided by a workload scheduler 402 and may, for example, receive inputs from a user 410. The workload scheduler 402 can be configured to allocate, according to an algorithm, the CPUs as isolated CPUs for the application-related workloads according to the number received from the user. The algorithm can determine which CPUs can be allocated as isolated CPUs considering the utilization of all CPUs within the server computing device 102. The workload scheduler 402 can allocate CPUs dynamically based on the determination of the algorithm. The CPUs that are not allocated as isolated CPUs are allocated as reserved CPUs for processing platform-related workloads.

A power manager 408 can be configured to send a request to the workload scheduler 402 for acquiring the CPU IDs of reserved CPUs (S20). The request sent from the power manager 408 can be made periodically. Alternatively, power manager 408 can register a hook to the workload scheduler 402, such that workload scheduler 402 can push CPU IDs to the power manager 408 when workloads are being scheduled. Upon receiving the request, the workload scheduler 402 sends the IDs of the reserved CPUs allocated for processing platform-related workloads to the power manager 408 (S30). When the power manager 408 receives the CPU IDs of the reserved CPUs from the workload scheduler 402, the platform can determine the power settings for the reserved CPUs according to an algorithm that can be hardcoded based on experimental profiling data or determined in real-time based on actual CPU utilization.

The power manager 408 can be configured to send instructions to a P/C-state controller 406 to set the P-state and C-state of reserved CPUs (S40) based on the determined power settings. The power settings applied to the reserved CPUs can be power settings suitable for platform-related workloads independent of application-related workloads. For example, platform workloads can involve tasks with stable load, so that the frequency of reserved CPUs can be kept at a minimum, while setting the state of reserved CPUs to the lowest C-state to idle the reserved CPUs and optimize power consumption. The power manager 408 can send the instructions for such settings to the P/C state controller 406. The P/C state controller 406 can adjust the frequency or states of the reserved CPUs upon receiving instructions from the power manager 408 (S50). This enables the optimization of power for reserved CPUs handling platform-related workloads independently without impacting the isolated CPUs for running application-related workloads.

Figure 5:
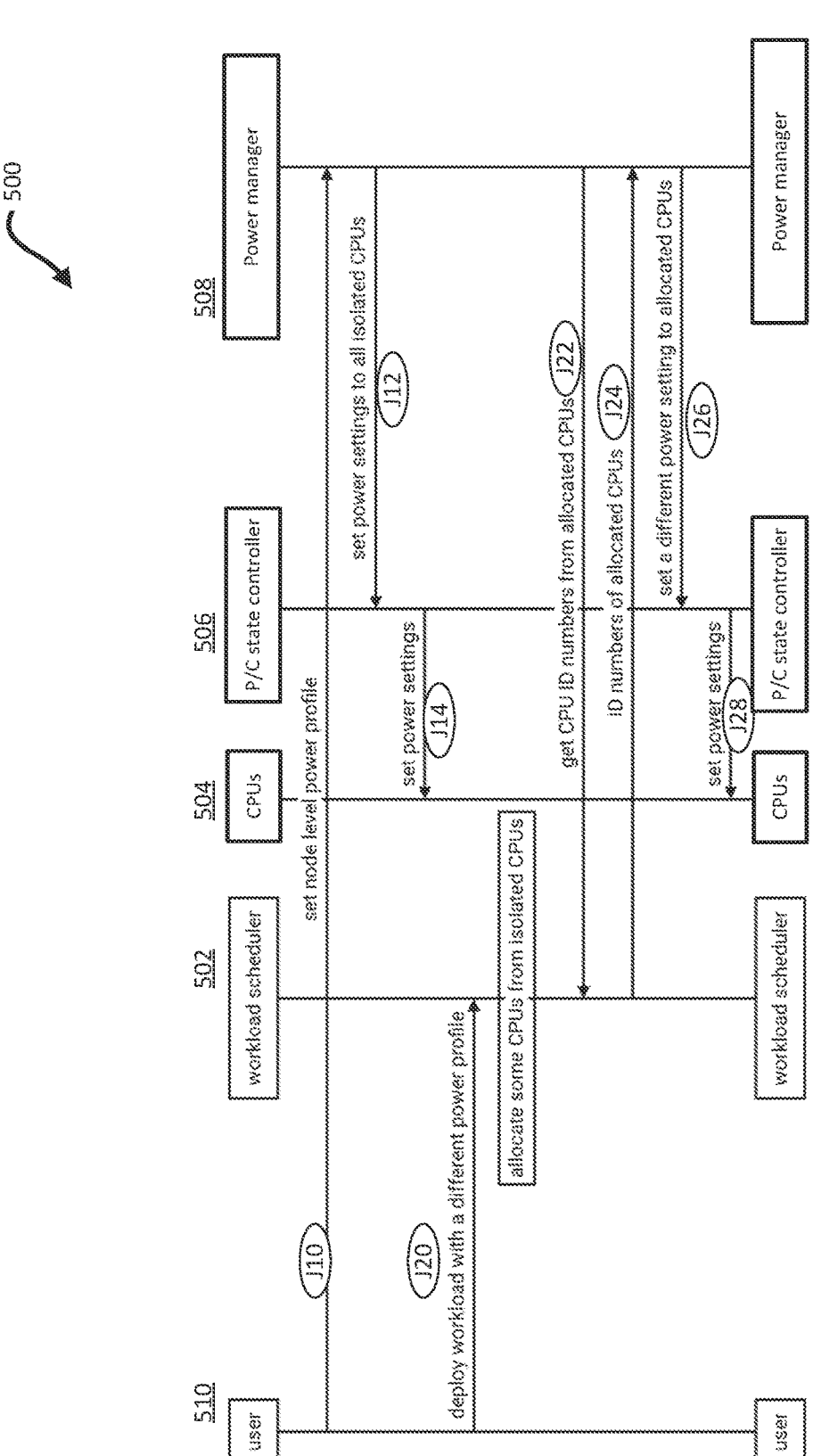
FIG. 5 is a sequence diagram showing signal flows among elements of the FIG. 3 processing environment according to an illustrative power management algorithm for setting power states of CPUs assigned to application-related workloads.

FIG. 5 is a sequence diagram 500 showing signal flows among elements of the FIG. 3 processing environment 300 according to an illustrative power management algorithm for setting power states of CPUs assigned to application-related workloads. In some embodiments, the platform can set the same power profile for all isolated CPUs regardless of application workloads (J10). The power profile for all isolated CPUs can be chosen from predefined options such as performance, balance of energy efficiency, or power-saving mode; or the user 510 can specify detailed settings for P-states and C-states of all isolated CPUs. A power manager 508 can set the power settings for all isolated CPUs based on the power profile and issue instructions to a P/C state controller 506 (J12). The P/C-state controller 506 can adjust the P-state and C-state of all isolated CPUs uniformly based on the instructions (J14).

In the event a particular application utilizes CPUs exclusively for its execution, the particular application can request specific power settings for such exclusive CPUs instead of applying the same power profile as that applied to all isolated CPUs. The new power profile for the particular application can be stored in a manifest of the particular application. In some other systems, to apply a new power profile to the exclusive CPUs, the user needs to manually specify the IDs of the isolated CPUs that will be used as exclusive CPUs for the particular application, with the server computing device providing an interface for receiving the user input that specifies the IDs of the isolated CPUs to be used as exclusive CPUs. However, this approach raises several issues. The specified CPU IDs by the user may be inconsistent with other settings and the selected CPUs may not be available to exEcute the particular application.

To address these issues, in the presently disclosed technology, the power manager 508 can be configured to utilize the decision of a workload scheduler 502. To deploy the particular application, the user 510 provides a manifest including a new power profile for the particular application to the workload scheduler 502 (J20). The workload scheduler 502 can, in turn, recognize when the new power profile requires exclusive CPUs for the particular application by referencing information of the new power profile stored in the application manifest. The workload scheduler 502 can then allocate isolated CPUs for use as exclusive CPUs for the particular application. Thus, the determination of the isolated CPUs for the particular application is made by the workload scheduler 502, allowing power settings without the need for manual input.

The power manager 508 can send a request to the workload scheduler 502 for acquiring the CPU IDs of the exclusive CPUs allocated to a particular application (J22). Upon receiving the request, the workload scheduler 502 sends the IDs of the exclusive CPUs to the power manager 508 (J24). After receiving the CPU IDs, the power manager 508 can send instructions to the P/C-states controller 506 to set the power settings for the exclusive CPUs and the P/C state controller 506 controls P-state and C-state of exclusive CPUs based on the new power profile for the particular application (J28).

In cases where multiple diverse applications are running, and one application cannot exclusively occupy isolated CPUs, server computing devices 102 can apply different power optimization mechanisms. For example, the workload scheduler 308 can be configured to allocate multiple CPUs from the isolated CPUs to run various applications on a non-exclusive basis. The IDs of the allocated CPUs can be shared with the power manager 306, which sets the power settings accordingly. The power manager 306 can adjust the CPU states of the allocated CPUs through the P/C state controller 304 based on the IDs of the allocated CPUs shared from the workload scheduler 308. For instance, the allocated CPUs can be set to the highest P-state and the lowest C-state to maximize CPU performance, although this power setting can result in the highest power consumption.

As a mechanism for setting power profiles for non-exclusive CPUs, the workload scheduler 308 can divide allocated CPUs into various groups, allowing the same power profile to be applied to each CPU within a group. In this manner, CPUs allocated to handle various applications can be divided into multiple groups, where CPUs processing workloads with similar or identical power profiles can be grouped together. Various algorithms such as K-means can be used to organize CPU groups. Essentially, the allocated CPUs can be formed into multiple groups, each group including multiple CPUs, and the same power profile can be applied to all CPUs in a group, such that power profiles are applied on a group-by-group basis. This optimization reduces power consumption by allowing similar workloads to be processed by allocated CPUs within a group with the same power profile.

It should be noted that in a server environment, the optimal construction of CPU sets or groups is impacted when workloads can be dynamically scheduled for a machine, moved out of the machine upon completion, or transferred to another machine before completion. To detect the changes of workloads, the power manager 306 can periodically request workload information to the workload scheduler 308, or the workload scheduler 308 can notify the power manager 306 of workload changes. When there are changes in the CPU groups, suitable new power profiles can be applied to the CPU groups by repartitioning the CPUs within a group.

The power manager 306 provides various instructions to the P/C state controller 304 for CPU state adjustments. Typically, the power manager can specify exact values like the maximum and minimum values of the CPU frequency. Within the server computing device 102, the power manager 306 can specify a step up or step down function, to gradually increase or decrease P-state and C-state to a final state over a predefined period of time. This would be able to address the gradual increase in traffic or throughput that is usually observed when traffic ramps up or down in a server network. In other embodiments, the power manager 306 can define a CPU utilization target. There can be a feedback loop within the P/C state controller 304 to monitor the current CPU utilization rate, checking whether it is low or high. Based on this assessment, the P/C states controller 304 can be configured to modify the P-state and C-state to align with the CPU utilization target.

Figure 6:
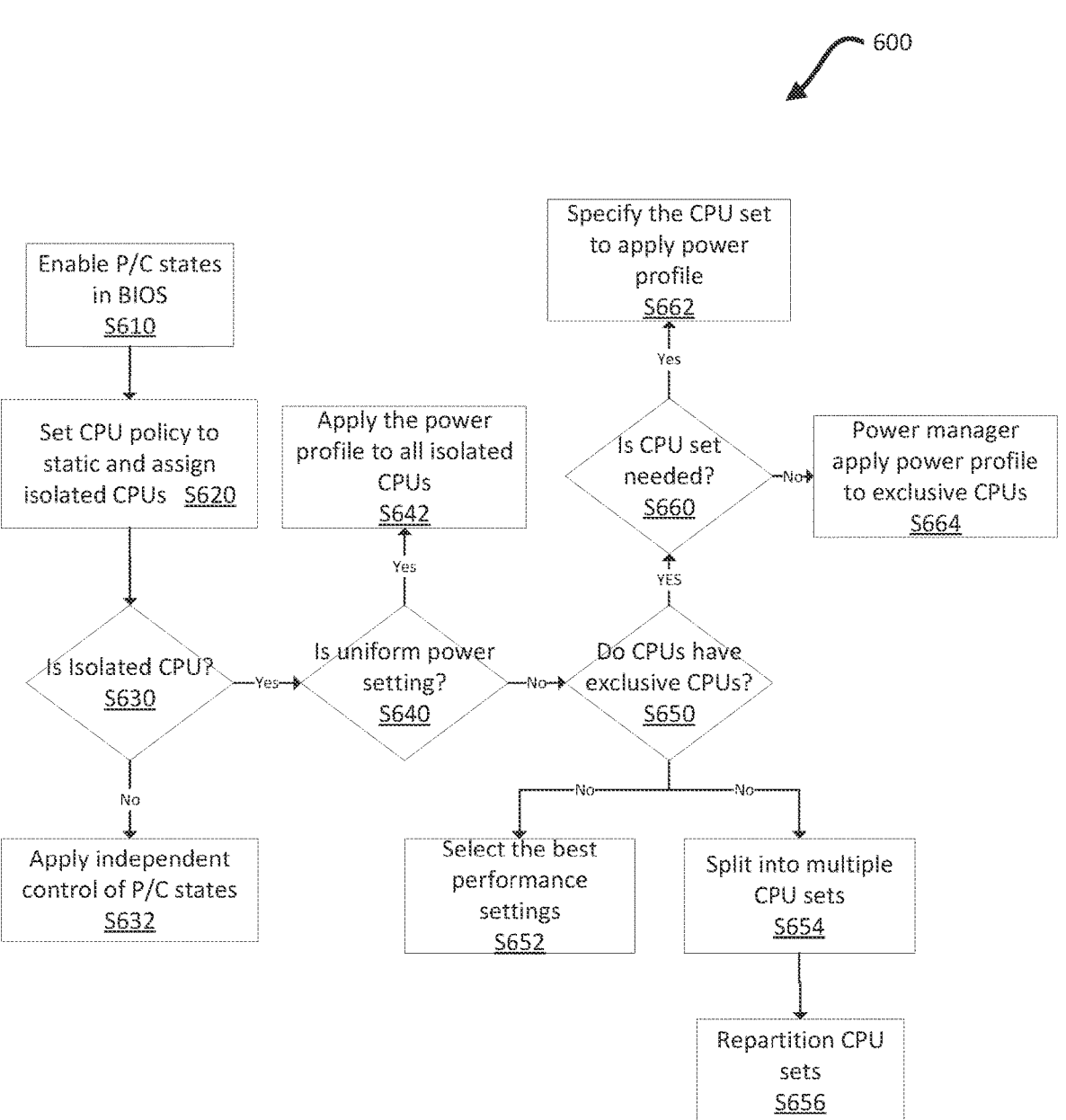
FIG. 6 is a flow diagram of an example process for performing power management to optimize power consumption by a server computing device.

Turning now to FIG. 6, the figure is a flow diagram of an example process 600 for performing power management to optimize power consumption by a server computing device, e.g., server computing device 102. As can be seen from FIG. 6, the server computing device 102 can be configured to enable, through the BIOS, the adjustment of P-states and C-states (S610). A workload scheduler, e.g., workload scheduler 308, can set isolated CPUs based on user inputs specifying a quantity of CPUs. The workload scheduler 308 can allocate the CPUs as isolated CPUs to run the applications, taking into account the workload to be processed (S620).

In case of a change in CPU allocation, a power manager, e.g., the power manager 306, can be configured to detect the changes and determine which CPUs require new power settings (S630). If the CPUs that currently need power settings are reserved CPUs, the power manager 306 can be configured to optimize power settings for the reserved CPUs independently of the isolated CPUs responsible for the application-related workloads (S632). The power settings can be performed by a P/C state controller, e.g., the P/C state controller 304, the P/C state controller adjusting the P-state and C-state of the reserved CPUs.

If the power manager 306 determines that the CPUs that currently need power settings are isolated CPUs, the power manager 306 can apply power settings according to how the application-related workloads are allocated to the isolated CPUs. The power manager 306 can determine whether all isolated CPUs need to have the same power settings (S640).

If so, the power manager 306 can apply a specific power profile to all isolated CPUs (S642). The specific power profile for the isolated CPUs can also be chosen from predefined options such as performance, balance of energy efficiency, or power-saving mode; or the user can specify detailed settings for P-states and C-states of the isolated CPUs.

If the workload of a particular application is scheduled on specific isolated CPUs the power manager 306 can determine that the specific isolated CPUs are exclusively allocated for a particular application (S650). If so, the power manager 306 can perform power settings only for the exclusive CPUs. In this case, a new power profile is applied to the exclusive CPUs for the particular application. In order to apply the new power profile to the exclusive CPUs, the power manager 306 needs to identify the IDs of the exclusive CPUs (S660). In some cases, the user can specify the IDs of the exclusive CPUs to the power manager 306 manually (S662). In other cases, within the server computing device 102, the workload scheduler 308 can be configured to allocate the exclusive CPUs for the particular application and share the IDs of the exclusive CPUs with the power manager 306. The power manager 306 can set the power settings of the exclusive CPUs based on the shared IDs from the workload scheduler 308 (S664).

When various applications are scheduled to the multiple isolated CPUs, the workload scheduler can allocate the CPUs from the isolated CPUs for the workloads of the various applications. The allocated CPUs cannot be assigned as exclusive CPUs. In this case, the power manager 306 can set the power settings for [This is not shared CPUs] allocated CPUs using various mechanisms. In some embodiments, the power manager 306 can set the allocated CPUs to ensure maximum performance (S652). However, this approach may not be efficient due to the substantial power consumption. Alternatively, the power manager 306 can be configured to divide the allocated CPUs into multiple groups of CPUs, the CPUs within each group processing similar applications. In this manner, CPUs belonging to the same group process applications with similar power requirements, thereby enabling effective power setting by applying the same power profile to the CPUs belonging to the same group (S654).

In a server environment, workloads for applications are dynamically allocated to CPUs, resulting in frequent changes within the CPU groups. In case of changing the CPU groups due to the workloads transferred to another machine or completed, the CPUs within the group are dynamically re-partitioned. The power manager 306 can apply the same power profile to the CPUs within the partitioned group (S656).

Embodiments of the present technology include, but are not restricted to, the following.

(1) A method for managing power in a computing device, the method including receiving a number of isolated central processing units (CPUs), the number of isolated CPUs indicating a quantity of CPUs of the computing device set as isolated CPUs; allocating the isolated CPUs based on the number of isolated CPUs; identifying, by one or more processors, CPU IDs of reserved CPUs, the reserved CPUs including CPUs of the computing device that are not set as the isolated CPUs; and controlling, by one or more processors, P-states and C-states of one or more of the reserved CPUs based on the identified CPU IDs.

(2) The method of (1), wherein the isolated CPUs are related to workloads for user applications and the reserved CPUs are related to workloads for a platform.

(3) The method of (1), wherein the controlling the P-states and C-states of the reserved CPUs includes at least one of setting a minimum frequency for one or more of the reserved CPUs or determining a maximum idle state for one or more of the reserved CPUs.

(4) The method of (3), wherein the controlling the P-states and C-states of the reserved CPUs includes setting the minimum frequency, and wherein the minimum frequency is set incrementally, beginning with an initial value and ending with a final value.

(5) The method of (3), wherein the minimum frequency is set by a P/C state controller.

(6) The method of (1), wherein receiving includes receiving the number of isolated CPUs via an interface provided by a workload scheduler.

(7) The method of (6), wherein the identifying CPU IDs of reserved CPUs includes sending a request for the CPU IDs of reserved CPUs from a power manager to the workload scheduler.

(8) The method according to (7), wherein the request is one of periodic requests sent from the power manager to the workload scheduler for purposes of identifying the CPU IDs of reserved CPUs.

(9) The method of (1), further including partitioning the isolated CPUs into a plurality of sets; and controlling the P-states and C-states of the isolated CPUs on a set-by-set basis.

(10) The method of (9), wherein for each set, each isolated CPU within the set requires a power profile that is the same or similar to one or more power profiles required by each other isolated CPU within the set.

(11) The method of (10), wherein the controlling the P-states and C-states of the isolated CPUs includes at least one of setting a minimum frequency for one or more of the isolated CPUs or determining a maximum idle state for one or more of the reserved CPUs.

(12) The method of (11), wherein the controlling the P-states and C-states of the isolated CPUs includes setting the minimum frequency, and wherein the minimum frequency is set incrementally, beginning with an initial value and ending with a final value.

(13) The method of (1), further including setting, by one or more processors, a general power profile for the isolated CPUs, the general power profile applying to all isolated CPUs; and controlling, by one or more processors, P-states and C-states of all isolated CPUs based on the general power profile.

(14) The method of (13), wherein the controlling the P-states and C-states of the isolated CPUs includes at least one of setting a minimum frequency for one or more of the isolated CPUs or determining a maximum idle state for one or more of the reserved CPUs.

(15) The method of (14), wherein the controlling the P-states and C-states of the isolated CPUs includes setting the minimum frequency, and wherein the minimum frequency is set incrementally, beginning with an initial value and ending with a final value.

(16) The method of (13), further including receiving a workload-specific number of CPUs, the workload-specific number of CPUs indicating a quantity of isolated CPUs for a workload of a particular user application; allocating CPUs for the workload of the particular user application based on the workload-specific number of CPUs; identifying, by one or more processors, CPU IDs of the allocated CPUs; and controlling, by one or more processors, P-states and C-states of the allocated CPUs.

(17) The method of (16), wherein the controlling P-states and C-states of the allocated CPUs includes controlling P-states and C-states of the allocated CPUs based on a new power profile, the new power profile being different from the general power profile, corresponding to the workload of the particular user application, and being provided by a power manager.

(18) The method of (16), wherein the identifying the CPU IDs of the allocated CPUs includes sending a request for the CPU IDs of the allocated CPUs from the power manager to a workload scheduler.

(19) The method of (16), wherein the controlling the P-states and C-states of the allocated CPUs includes at least one of setting a minimum frequency for one or more of the allocated CPUs or determining a maximum idle state for one or more of the reserved CPUs.

(20) The method of (19), wherein the controlling the P-states and C-states of the allocated CPUs includes setting the minimum frequency, and wherein the minimum frequency is set incrementally, beginning with an initial value and ending with a final value.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing power in a computing device, the method comprising:

receiving a number of isolated central processing units (CPUs), the number of isolated CPUs indicating a quantity of CPUs of the computing device set as isolated CPUs;

allocating the isolated CPUs based on the number of isolated CPUs;

identifying CPU IDs of reserved CPUs, the reserved CPUs comprising CPUs of the computing device that are not set as the isolated CPUs; and controlling P-states and C-states of one or more of the reserved CPUs based on the identified CPU IDs, wherein the isolated CPUs handle only workloads for user applications and the reserved CPUs handle only workloads for a platform, wherein allocating the isolated CPUs comprises considering the utilization of all CPUs of the computing device, wherein when a workload of a particular user application requires a workload-specific number of CPUs, the workload-specific number of CPUs indicating a quantity of isolated CPUs for exclusive use on the workload of the particular user application, the method further comprises allocating, by a workload scheduler, one or more of the isolated CPUs as workload-specific CPUs for the workload of the particular user application based on a new power profile, the new power profile being different from a general power profile and corresponding to the workload of the particular user application;

identifying CPU IDs of the allocated CPUs; and controlling P-states and C-states of the allocated CPUs based on the new power profile; and wherein the controlling the P-states and C-states of the isolated CPUs comprises at least one of setting a minimum frequency for one or more of the isolated CPUs or determining a maximum idle state for one or more of the reserved CPUs.

2. The method of claim 1, wherein the controlling the P-states and C-states of the reserved CPUs comprises at least one of setting a minimum frequency for one or more of the reserved CPUs or determining a maximum idle state for one or more of the reserved CPUs.

3. The method of claim 2, wherein the controlling the P-states and C-states of the reserved CPUs comprises setting the minimum frequency, and wherein the minimum frequency is set incrementally, beginning with an initial value and ending with a final value.

4. The method of claim 2, wherein the minimum frequency is set by a P/C state controller.

5. The method of claim 1, wherein receiving comprises receiving the number of isolated CPUs via an interface provided by a workload scheduler.

6. The method of claim 5, wherein the identifying CPU IDs of reserved CPUs comprises sending a request for the CPU IDs of reserved CPUs from a power manager to the workload scheduler.

7. The method according to claim 6, wherein the request is one of periodic requests sent from the power manager to the workload scheduler for purposes of identifying the CPU IDs of reserved CPUs.

8. The method of claim 1, further comprising:

partitioning the isolated CPUs into a plurality of sets; and controlling the P-states and C-states of the isolated CPUs on a set-by-set basis.

9. The method of claim 8, wherein for each set, each isolated CPU within the set requires a power profile that is the same or similar to one or more power profiles required by each other isolated CPU within the set.

10. The method of claim 9, wherein the controlling the P-states and C-states of the isolated CPUs comprises at least one of setting a minimum frequency for one or more of the isolated CPUs or determining a maximum idle state for one or more of the reserved CPUs.

11. The method of claim 10, wherein the controlling the P-states and C-states of the isolated CPUs comprises setting the minimum frequency, and wherein the minimum frequency is set incrementally, beginning with an initial value and ending with a final value.

12. The method of claim 1, further comprising: setting the general power profile for the isolated CPUs, the general power profile applying to all isolated CPUs; and controlling P-states and C-states of all isolated CPUs based on the general power profile.

13. The method of claim 12, wherein the controlling the P-states and C-states of the isolated CPUs comprises setting the minimum frequency, and wherein the minimum frequency is set incrementally, beginning with an initial value and ending with a final value.

14. The method of claim 1, wherein the identifying the CPU IDs of the allocated CPUs comprises sending a request for the CPU IDs of the allocated CPUs from a power manager to the workload scheduler.

15. The method of claim 1, wherein the controlling the P-states and C-states of the allocated CPUs comprises at least one of setting a minimum frequency for one or more of the allocated CPUs or determining a maximum idle state for one or more of the reserved CPUs.

16. The method of claim 15, wherein the controlling the P-states and C-states of the allocated CPUs comprises setting the minimum frequency, and wherein the minimum frequency is set incrementally, beginning with an initial value and ending with a final value.

* * * * *